(12) United States Patent
Gerster

(10) Patent No.: US 6,305,991 B1
(45) Date of Patent: Oct. 23, 2001

(54) METHOD OF CONNECTING METALLIC CONDUCTORS, AND A LINE-BAR CONNECTION PRODUCED IN ACCORDANCE WITH THE METHOD

(75) Inventor: Max Gerster, Winkel (CH)

(73) Assignee: Zurecon AG, Zurich (CH)

( * ) Notice: Subject to any disclaimer, the term of this patent is extended or adjusted under 35 U.S.C. 154(b) by 0 days.

(21) Appl. No.: 09/461,817

(22) Filed: Dec. 16, 1999

(30) Foreign Application Priority Data

Dec. 16, 1998 (CH) .................................... 2486/98

(51) Int. Cl.[7] ........................................ H01R 4/38
(52) U.S. Cl. ............................. 439/801; 439/886
(58) Field of Search ............................ 439/801; 77/886

(56) References Cited

U.S. PATENT DOCUMENTS

| | | | |
|---|---|---|---|
| 3,002,173 | * 9/1961 | Allen . | |
| 3,895,853 | 7/1975 | Neidecker | 439/810 |
| 5,073,121 | * 12/1991 | Jaenke et al. | 439/92 |
| 6,089,930 | * 7/2000 | Matsuoka et al. | 439/886 |

FOREIGN PATENT DOCUMENTS 551 698     7/1974   (CH) .
11-185842  * 9/1999   (JP) ................................ H01R/4/38

* cited by examiner

Primary Examiner—Neil Abrams
Assistant Examiner—Michael C. Zarroli
(74) Attorney, Agent, or Firm—Browdy and Neimark

(57) ABSTRACT

The invention is directed to connected metallic conductors which are flat and made from aluminum or aluminum-copper compounds. Oppositely-located contact surfaces (3) are provided with grooves (4), indentations or the like on the conductors. During assembly, the contact surfaces (3) are brought into direct contact, and the conductors are pressed together with such a strong force that a plastic deformation and, consequently, a metallic, electrically-conductive contact are effected at a plurality of locations at the contact surfaces. The plastic deformation effects a breaking open or splintering of oxide layers present at the contact surfaces, which exposes bare metal for producing the contact. The pressing force can be generated by tightening screws (in bores 2), which are led, for example, directly through the contact surfaces (3). A connection of line-bar segments with a plurality of parallel conductors is also described.

6 Claims, 2 Drawing Sheets

METHOD OF CONNECTING METALLIC CONDUCTORS, AND A LINE-BAR CONNECTION PRODUCED IN ACCORDANCE WITH THE METHOD

BACKGROUND OF THE INVENTION

1. Technical Field of the Invention

The invention relates to a method of connecting conductors via a respective contact surface, with the contact surfaces being joined facing one another. The invention further relates to a line-bar connection that is produced in accordance with this method.

2. Prior Art

A typical application of the method is found in so-called line bars (also called bar-type distributors), which are used for supplying power to machines, climate-control systems and lighting systems, and are suited for conducting electrical currents of several hundred amps. These line bars include a plurality of insulated conductors that are guided parallel in the form of solid, flat profiles comprising copper or aluminum. They are produced as individual elements, for example, straight or angled segments, branches, or with connections that branch off laterally, etc. Such elements are then joined to form a system, often long after the production process. In the process, the ends of the conductors are to be connected to one another at the assembly site so as to be mechanically and electrically conductive. Compression joints between overlapping contact surfaces—for example, by means of screw connections—are practically exclusively considered; in contrast, welding the conductors at the site of the line-bar assembly would be very expensive and hardly acceptable for safety reasons.

Connecting solid, copper conductors typically poses no problems. For cost reasons, however, aluminum conductors are also being used in increasing numbers. It is known that a dense layer of hard, brittle aluminum oxide, which is an extremely poor conductor, has already formed on the aluminum after a short period of time. Without special measures, therefore, mechanical (compression) connections between aluminum conductors and aluminum-copper compounds would be affected by high electrical transition resistances, which would be intolerable in, for example, conductors and elsewhere.

One possible remedy is to brush the contact surfaces bare immediately prior to joining the conductors, that is, at the assembly site. This is, however, an extremely time-consuming and laborious process, because the contact surfaces at the ends of the line-bar elements are often difficult to access. The success of the measure also depends heavily on painstaking labor that must be checked precisely. To avoid interfering oxide layers, or to assure bare contact surfaces with a low transition resistance, it is known to provide aluminum conductors with a coating of nickel, tin or silver in the connecting region. Unfortunately, this work step is associated with additional labor and corresponding costs, which increases the cost of the line-bar elements considerably.

It is also known to insert special structural elements between the contact surfaces of the conductors during the connecting process for the purpose of better contacting: U.S. Pat. No. 3,895,853 describes the use of resilient, wavy metal strips forming lamella that protrude on two sides. In contrast, Swiss Patent No. 551 698 proposes a ring that is disposed around a tightening screw and forms a circular, sharp edge at each end face; when the screw is tightened, each of these edges is pressed into one of the contact surfaces. These proposals entail additional mechanical parts, which incur corresponding production costs, and complicate and raise the cost of assembly significantly. The additional parts stipulate a corresponding spacing between the contact surfaces. The connection correspondingly requires more space, which is crucial particularly for conductor elements having multiple conductors and connecting points located in a "packet-wise," adjacent arrangement. Finally, a disadvantage is that no direct contact is produced between the conductors, but two current transitions are formed in series with a correspondingly-increased transition resistance.

OBJECT AND SUMMARY OF INVENTION

The invention is therefore intended to provide a method that is simple to execute and cost-effective, and assures electrically and mechanically flawless connections in the use of conductors, particularly aluminum conductors, even after a long storage period (the time between production and assembly of the conductors).

In accordance with the invention, this object is accomplished by a method in which at least the contact surface of the one conductor are provided, prior to the joining process, with grooves, indentations and/or notches that are angled at the surface; the contact surfaces are brought into direct contact and the conductors are pressed together with such a strong force that a mutual, plastic deformation and, consequently, a metallic, electrically-conductive contact are created at a plurality of separate locations at the contact surfaces.

The preparatory machining of the contact surfaces—creation of the grooves, indentations, etc.—need not necessarily be performed immediately prior to the joining of the conductors; rather, a lengthy period of time can pass between these method steps. It has been seen that, in the subsequent pressing of the conductors and the resulting material deformation, a brittle oxide layer that has formed in the interim is broken open at the numerous contact points and splintered on both sides, exposing the bare metal. At the compression points, the material is fluidly compressed, resulting in the desired, permanently-low transition resistance due to a plurality of parallel metallic contacts. The preparatory surface machining of the contact surfaces can be performed at low cost with simple tools during the production of the conductors, for example by means of a correspondingly-shaped pressing ram or through material removal with a comb-like, indented drawing tool. A particular advantage is that no additional parts whatsoever are required for the joining of the conductors, and the contact surfaces lie directly against one another. This makes the assembly extraordinarily simple. The electrical and mechanical contacts distributed over a large portion of the contact surfaces are produced reliably and with uniform quality. Of course, a sufficient surface pressure must be generated to bring about the plastic deformation and the desired low transition resistances at the compression points; a corresponding pressing force is, however, necessary anyway for the stable mechanical connection.

BRIEF DESCRIPTION OF THE DRAWINGS

The invention is described in detail below by way of exemplary embodiments, with reference to the drawing.

FIG. 1 is a view in perspective of two conductors 1a and 1b in the form of flat profiles, for example comprising aluminum, that are to be connected to each other via contact surfaces 3 so as to be electrically conductive. The contact surfaces 3 in the end regions of the two conductors are provided with a plurality of grooves 4 or the like, which are sharply angled at the surface (i.e., in the plane of the surfaces 3). Furthermore, the conductors 1a and 1b respectively have a throughgoing bore 2 for receiving a tightening screw 6 (FIG. 3), the bore preferably extending through the contact surfaces 3

The conductors prepared in this manner can be connected to one another either immediately after the machining process, or after a lengthy storage period. An oxide layer that has formed on the surface or on the contact surfaces 3 has no effect on the quality of the electrical contact points formed during the connection. To produce the connection, the conductors 1a, 1b are joined such that their contact surfaces 3 are in direct contact. Afterward, the conductors are pressed together with such a strong force that a mutual plastic deformation occurs at the contact surfaces. This produces a metallic, electrically-conducting contact at a plurality of locations distributed over the contact surfaces.

Figure 1:
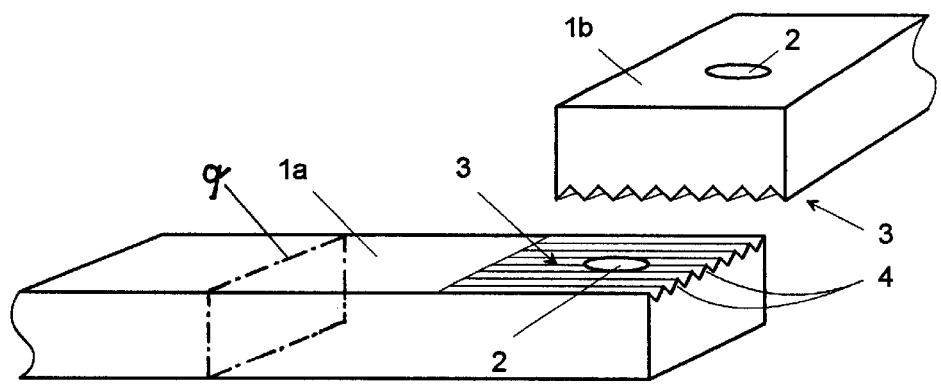
FIG. 1 shows two conductors to be connected, their contact surfaces having been machined prior to the joining process.
Figure 2:
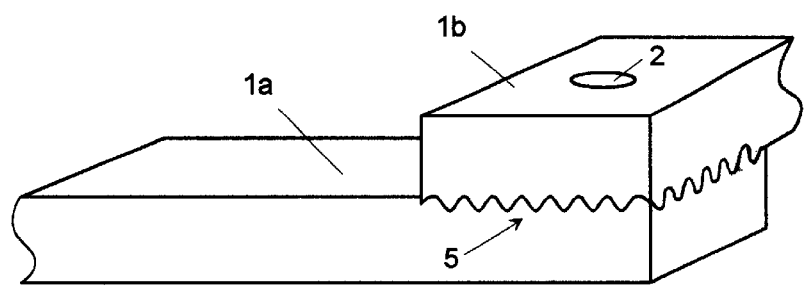
FIG. 2 shows the connected conductors, but without tensioning elements for generating a pressing force at the contact surfaces.

FIG. 2 is a schematic representation of the connection produced between the conductors 1a and 1b (for the sake of a better overview, the tightening screw is not shown here). The plastic deformation occurring at the contact surfaces due to the pressing force is indicated by the outer, wavy separating line 5 between the conductors. In connections of this type, the expansion of the contact surfaces 3 is typically selected to be significantly greater than the conductive cross section of the conductors (cross section q of the flat profiles, indicated by a dot-dash line in FIG. 1). Due to the large number of metallic contacts distributed over the contact surfaces, the electrical transition resistance of the connection can be relatively low.

Figure 3:
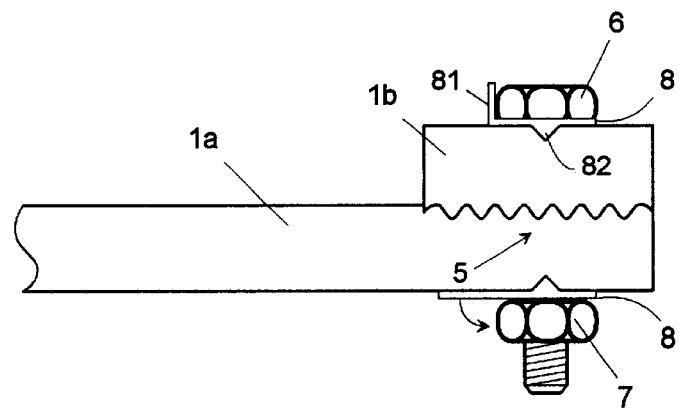
FIG. 3 shows the same connectors, as held together by means of a tightening screw and a nut.

In the present example, a tightening screw 6 with a nut 7 is used to generate the necessary pressing force according to FIG. 3. In individual connections, it can be useful to lead the tightening screw 6 (or the bore 2 receiving the tightening screw) directly through the contact surfaces 3.

FIG. 3 shows a side view of the complete electrical and mechanical connection with the tightening screw 6 and the nut 7. Instead of conventional washers under the screw head and the nut, special washers 8 are used here to secure the screw. These washers 8 have a lateral safety tab 81 and, at the surface facing the conductor 1a, 1b, a mandrel (or tooth) 82. When the screw and nut are tightened, the mandrel 82 pierces the conductive material, thus preventing a twisting of the washer 8. The tab 81 at the two washers 8 is bent toward the screw head or nut (indicated in the downward direction in FIG. 3), which protects the screw connection against later loosening.

The pressing force generated by the screw connection must be strong enough to effect the aforementioned plastic deformation and therefore the metallic contacts at the contact surfaces 3, that is, at the edges of the grooves 4 or the like. This is generally attained with a pressing force that is necessary anyway for a stable mechanical connection of the conductors. To assure uniform results, a torque key can be used to tighten the screws.

Figure 4:
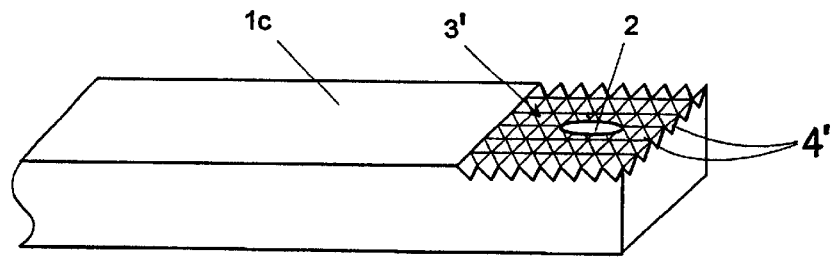
FIG. 4 shows an individual conductor whose contact surface is machined according to a variation.

The contact surfaces of the conductors can also be prepared for the connection other than with the parallel grooves 4 shown in FIG. 1. FIG. 4 shows a variation that includes a conductor 1c, whose contact surface 3' has a plurality of indentations 4'. It is also conceivable to provide regularly- or irregularly-distributed notches, or a combination of different angled shapes, at the surface, which experience a plastic deformation with a sufficient pressing force. It has been seen that a relatively-fine machining to a small depth is sufficient, for example parallel grooves 4 according to FIG. 1 with a distribution (spacing) and depth of a few tens of millimeters.

At the time of the conductor production, a corresponding machining of the contact surfaces can be performed, for example by means of a pressing ram or, preferably, through material removal such as grinding or with the use of an indented drawing or shaving tool. It may suffice to machine only the contact surface at one of the two conductors to be connected, such as in the case of the connection of aluminum conductors with copper conductors, whereby it is advisable to machine the aluminum contact surface.

Figure 5:
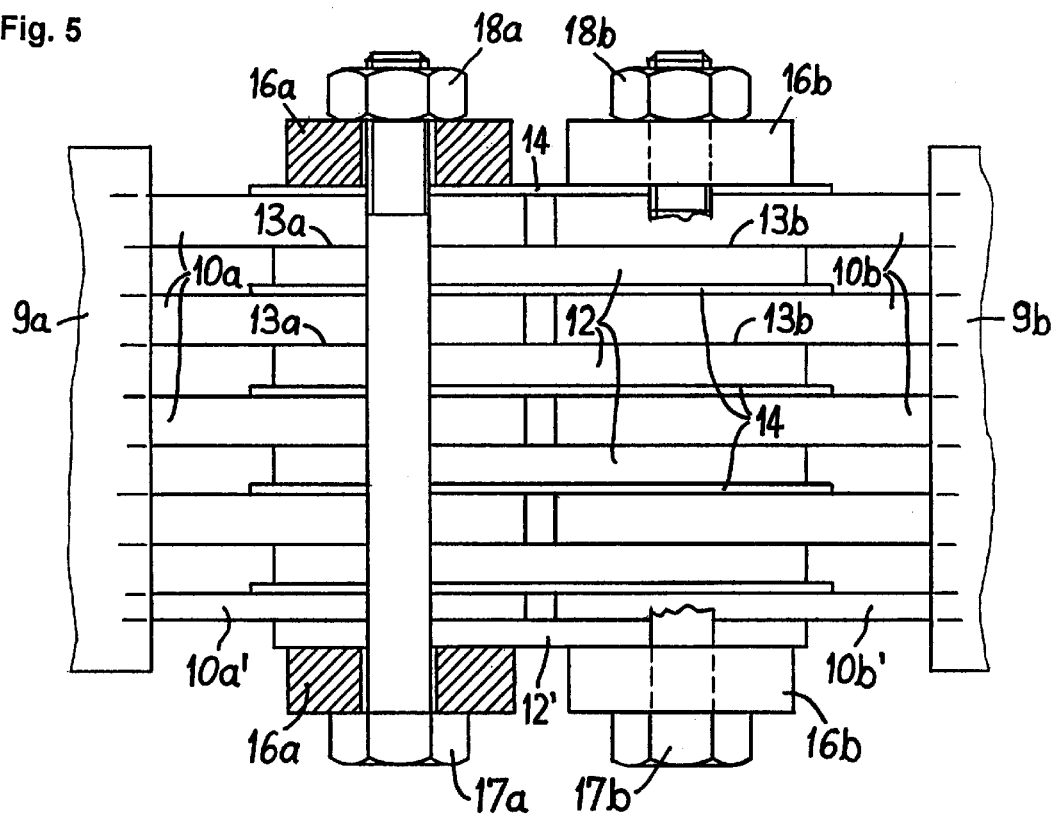
FIG. 5 shows an example with a partial section of a connection of two line-bar segments, each having a plurality of conductors.

FIG. 5 shows, as a further exemplary embodiment, a connection of two line-bar segments 9a and 9b. This line-bar system has numerous—in the present case, four phase conductors 10a and 10b, and a protective conductor 10a' and 10b'. The flat-profile conductors 10a, 10a' and 10b, 10b' of the segments are cast in a known manner in, for example, in an insulating compound, with their ends that are to be connected being exposed. Prior to the casting process, the conductors are lengthened individually and machined completely mechanically: In particular, their contact surfaces 13a and 13b are provided with suitable grooves, indentations or the like, as described above (not shown in detail in FIG. 5).

For the connection of the prepared segments 9a and 9b, they are positioned opposite one another, as shown in FIG. 5, so the conductors are oriented toward one another in pairs. Afterward, metallic, conductive intermediate plates 12, 12'—as connecting conductors—and insulating plates 14 are inserted, as shown.

Each intermediate plate respectively overlaps the ends of a conductor pair 10a, 10b and 10a', 10b', the plates 12, 12' also preferably having grooves or the like at their contact surfaces facing the conductors. The insulating plates 14 are intended to protrude on all sides beyond the intermediate plates 12, 12', or (in width), beyond the conductors.

Tensioning elements comprising tightening screws 17a, 17b and nuts 18a, 18b, and yoke plates 16a, 16b generate the pressing force at the layered "packet" for the purpose of an electrical and mechanical connection of the line-bar segments 9a and 9b. Such a tensioning element is allocated to each segment 9a and 9b, specifically in the region of its contact surfaces 13a and 13b: Two oppositely-located yoke plates are respectively connected by two screws, which extend laterally next to the conductors, intermediate plates and insulating plates. The electrical and mechanical connections at the contact surfaces 13a and 13b are produced by the tightening of the tightening screws or nuts in essentially the same manner as described above in connection with the examples according to FIGS. 1 through 4.

Connecting regions of line-bar segments according to FIG. 5 (so-called couplings) are usually surrounded by a housing, as is known per se, and can be cast around as needed, for example with casting resin on a polymer or epoxy base.

Line-bar connections according to FIG. 5 are primarily suited for systems having aluminum conductors, but connections between segments having aluminum conductors and copper conductors can also be produced in the same way. It is also possible to provide only the contact surfaces of the intermediate plates 12, 12', and not the conductors of the segments 9a, 9b, with grooves or the like. The method is, of course, also applicable to differently-shaped line-bar elements, such as straight segments, angled elements, Z elements, connecting elements (with current branches), etc.

What is claimed is:

1. A line-bar connection comprising:

a first line-bar segment (9a) and a second line-bar segment (9b) each having a plurality of conductors (10, 10a, 10b, 10b'), each of the conductors having a contact surface;

corresponding conductors of the first line-bar segment and the second line-bar segment being oriented toward one another and connected by an intermediate plate (12;

the intermediate plate (12) having contact surfaces that respectively engage the contact surface of each of the corresponding conductors;

a first tensioning element (16a, 17a, 18a) being associated with the plurality of conductors of the first line-bar segment;

a second tensioning element (16b, 17b, 18b) being associated with the plurality of conductors of the second line-bar segment;

wherein either the contact surfaces of the intermediate plate (12) or the contact surface of each of the plurality of conductors has grooves, indentations, or notches(4); and wherein the first and second tensioning elements exert a pressing force between the corresponding conductors and the intermediate plate that results in a plastic deformation of engaged contact surfaces.

2. The line-bar connection of claim 1, wherein the first and second tensioning elements are respectively inserted through a bore directly through corresponding contact surfaces.

3. The line-bar connection of claim 1, wherein the grooves, indentations, and/or notches are distributed regularly over the contact surfaces.

4. The line-bar connection of claim 1, wherein the grooves, indentations, and/or notches have an angled surface.

5. The line-bar connection of claim 1, wherein the first and second tensioning elements are disposed outside the contact surfaces and the pressing force is transmitted by means of yoke plates (16).

6. The line-bar connection of claim 1, wherein adjacent groups of the corresponding conductors and the connecting intermediate plate are separated by an insulating plate (14).

* * * * *